(12) United States Patent
Chen et al.

(10) Patent No.: US 8,498,231 B2
(45) Date of Patent: Jul. 30, 2013

(54) SYSTEM AND METHOD FOR MULTICAST AND BROADCAST SERVICE SYNCHRONIZATION

(75) Inventors: You-Lin Chen, Yuanlin Township (TW); Jen-Shun Yang, Jhubei (TW); Wei-Han Kuo, Yongkang (TW); Chia-Lung Liu, Longtan Township (TW)

(73) Assignee: Industrial Technology Research Institute, Hsinchu (TW)

( * ) Notice: Subject to any disclaimer, the term of this patent is extended or adjusted under 35 U.S.C. 154(b) by 798 days.

(21) Appl. No.: 12/425,103

(22) Filed: Apr. 16, 2009

(65) Prior Publication Data

US 2010/0034129 A1 Feb. 11, 2010

Related U.S. Application Data

(60) Provisional application No. 61/086,195, filed on Aug. 5, 2008.

(51) Int. Cl.
*H04H 20/71* (2008.01)
*H04W 4/00* (2009.01)
*H04J 3/06* (2006.01)

(52) U.S. Cl.
USPC ............................ 370/312; 370/338; 370/350

(58) Field of Classification Search
USPC ......................................................... 370/312
See application file for complete search history.

(56) References Cited

U.S. PATENT DOCUMENTS

2006/0239264 A1* 10/2006 Kang et al. .................... 370/390
2008/0175237 A1* 7/2008 Kim ............................... 370/389
2008/0311949 A1* 12/2008 Koskinen et al. ............. 455/525

FOREIGN PATENT DOCUMENTS

| CN | 1764086 A | 4/2006 |
| CN | 101056249 A | 10/2007 |
| EP | 1903813 A1 | 3/2008 |

* cited by examiner

*Primary Examiner* — Derrick Ferris
*Assistant Examiner* — Majid Esmaeilian
(74) *Attorney, Agent, or Firm* — Finnegan, Henderson, Farabow, Garrett & Dunner, LLP

(57) ABSTRACT

A method for an access service network gateway (ASN-GW) to provide multicast and broadcast services (MBSs) through a plurality of base stations (BSs) in an MBS zone. The method includes: generating a plurality of synchronization maps (SYNC MAPs) including synchronization information for the BSs to generate MBS data frames; and transmitting to the BSs the generated SYNC MAPs, one in each of a plurality of schedule intervals.

17 Claims, 10 Drawing Sheets

SYSTEM AND METHOD FOR MULTICAST AND BROADCAST SERVICE SYNCHRONIZATION

RELATED APPLICATIONS

This application is based upon and claims the benefit of priority from U.S. Provisional Patent Application No. 61/086,195, filed Aug. 5, 2008, the entire contents of which are incorporated herein by reference.

FIELD OF THE INVENTION

This invention pertains in general to systems and methods for multicast and broadcast service (MBS) synchronization.

BACKGROUND

Wireless communications operating according to a predetermined protocol have gained worldwide popularity. The advantages of the wireless medium include the capacity to address broad geographic areas without expensive infrastructure development such as running cables. The broadband wireless access industry often is guided by IEEE standard 802.16 for wide area networks.

Worldwide Interoperability for Microwave Access (WiMAX) is a wireless communications technology for providing wireless data based on the IEEE standard 802.16. A WiMAX network provides an alternative to cabled access networks, such as a digital subscriber line (DSL). In addition, the WiMAX technology may provide fixed, nomadic, portable, and mobile wireless broadband connectivity to a base station.

The IEEE standard 802.16 supports a multicast and broadcast service (MBS), which can provide content data to a plurality of users who desire to receive a same service in the WiMAX network. For example, the content data may be movies, games, or TV programs, and is usually stored on one or more MBS servers. A mobile station (MS), such as a mobile phone or a laptop computer, subscribing to an MBS may receive MBS data that includes the content data and control information, through access to one or more base stations (BSs) in the WiMAX network.

For example, the BSs may each transmit the MBS data based on a same multicast connection identifier (MCID). Typically, the BSs are in a same MBS zone. An MBS zone is a set of BSs in a geographic area which use the same MCID to transmit MBS data. The advantages of the MBS zone include that the MS may receive signals from ones of the BSs in the MBS zone simultaneously. This would provide a diversity gain for the received signals. Further, the MS may receive the MBS data from any one of the BSs in the MBS zone without requiring a handover.

Typically, the MBS data is transmitted in a plurality of data frames. For example, according to the IEEE standard 802.16, a data frame may include a downlink map (DL-MAP), an MBS map (MBS-MAP), a plurality of MBS data bursts including the content data, and other information. The DL-MAP includes an MBS-MAP information element (MBS-MAP-IE), which indicates in that data frame a location of the MBS-MAP based on, e.g., symbol offsets, and provides information for the MS to perform synchronization with the MBS-MAP.

The MBS-MAP includes one or more MBS data information elements (MBS-DATA-IEs) or extended MBS data information elements (Extended MBS-DATA-IEs), collectively referred to herein as MBS-DATA-IEs, which provide access information for MBS data bursts in the plurality of data frames. For example, the MBS data is typically transmitted on a plurality of logical channels, and each of the MBS-DATA-IEs provides a connection identifier for one of the plurality of logical channels. Also for example, a first one of the MBS-DATA-IEs indicates in the plurality of data frames a location of an MBS data burst corresponding to a first one of the logical channels based on, e.g., frame and symbol offsets. The first one of the MBS-DATA-IEs also indicates in the plurality of data frames a location of a next MBS-MAP including information relating to the first one of the logical channels.

FIG. 1 illustrates a conventional MBS data structure 100, according to the IEEE standard 802.16. The MBS data structure 100 includes a plurality of data frames 101, which are transmitted from a BS to an MS. For example, the BS may deliver content of a first TV program on a first logical channel, content of a second TV program on a second logical channel, and content of a movie on a third logical channel. For convenience of illustration, only MBS-MAP-IEs, MBS-MAPs, MBS-DATA-IEs, and MBS data bursts that relate to the first, second, and third logical channels are labeled on the MBS data structure 100.

Referring to FIG. 1, the MBS data structure 100 may include MBS-MAP-IEs 102, 104, and 106, MBS-MAPs 112, 114, and 116, and data bursts 122-$i$ ($i$=1, 2, 3), 124-$i$ ($i$=1, 2), and 126-$i$ ($i$=1, 2, 3). The MBS-MAPs 112, 114, 116 may further include MBS-DATA-IEs 132-$i$ ($i$=1, 2, 3), 134-$i$ ($i$=1, 2), and 136-$i$ ($i$=1, 2, 3), respectively. The MBS-DATA-IEs 132-1, 134-1, and 136-1 and the MBS data bursts 122-1, 124-1, and 126-1 relate to the first logical channel. The MBS-DATA-IEs 132-2, 134-2, and 136-2 and the MBS data bursts 122-2, 124-2, and 126-2 relate to the second logical channel. The MBS-DATA-IEs 132-3 and 136-3 and the MBS data bursts 122-3 and 126-3 relate to the third logical channel.

For example, the MBS-MAP-IEs 102, 104, and 106 indicate locations of the MBS-MAPs 112, 114, and 116 in the data frames 101, respectively. For the first logical channel, the MBS-DATA-IEs 132-1, 134-1, and 136-1 provide a first connection identifier, and indicate in the data frames 101 locations of the MBS data bursts 122-1, 124-1, and 126-1, respectively. In addition, the MBS-DATA-IE 132-1 indicates in the data frames 101 a location of the next MBS-MAP 114. The MBS-DATA-IE 134-1 in the MBS-MAP 114 further indicates a location of the next MBS-MAP 116.

Also for example, for the second logical channel, the MBS-DATA-IEs 132-2, 134-2, and 136-2 provide a second connection identifier, and indicate in the data frames 101 locations of the MBS data bursts 122-2, 124-2, and 126-2, respectively. In addition, the MBS-DATA-IE 132-2 indicates in the data frames 101 the location of the next MBS-MAP 114. The MBS-DATA-IE 134-2 in the MBS-MAP 114 further indicates the location of the next MBS-MAP 116.

Further for example, for the third logical channel, the MBS-DATA-IEs 132-3 and 136-3 provide a third connection identifier, and indicate in the data frames 101 locations of the MBS data bursts 122-3 and 126-3, respectively. In addition, the MBS-DATA-IE 132-3 indicates in the data frames 101 the location of the next MBS-MAP 116. All of the above-described location indications are represented by the dashed lines and arrows in FIG. 1.

The MS may receive the content on one of the three logical channels by reading the data frames 101. For example, if the MS wants to receive the content on the first logical channel, the MS may read the MBS-MAP-IE 102. Based on the MBS-MAP-IE 102, the MS may know when to read the MBS-MAP 112. Based on the MBS-DATA-IE 132-1 in the MBS-MAP 112, the MS may further know when to read the MBS data burst 122-1 and the next MBS-MAP 114. Similarly, based on the MBS-DATA-IE 134-1 in the MBS-MAP 114, the MS may know when to read the MBS data burst 124-1 and the next MBS-MAP 116, and based on the MBS-DATA-IE 136-1 in the MBS-MAP 116, the MS may further know when to read the MBS data burst 126-1. In this manner, the MS may read the MBS data bursts 122-1, 124-1, and 126-1 for the content delivered on the first logical channel. Similarly, the MS may read the MBS data bursts 122-2, 124-2, and 126-2 for the content delivered on the second logical channel, or the MBS data bursts 122-3 and 126-3 for the content delivered on the third logical channel.

SUMMARY

According to a first aspect of the present disclosure, there is provided a method for an access service network gateway (ASN-GW) to provide multicast and broadcast services (MBSs) through a plurality of base stations (BSs) in an MBS zone, the method comprising: generating a plurality of synchronization maps (SYNC MAPs) including synchronization information for the BSs to generate MBS data frames; and transmitting to the BSs the generated SYNC MAPs, one in each of a plurality of schedule intervals.

According to a second aspect of the present disclosure, there is provided an access service network gateway (ASN-GW) for providing multicast and broadcast services (MBSs) through a plurality of base stations (BSs) in an MBS zone, the ASN GW comprising: a processor configured to generate a plurality of synchronization maps (SYNC MAPs), the SYNC MAPs including synchronization information for the BSs to generate MBS data frames; and an input/output (I/O) device configured to transmit to the BSs the generated SYNC MAPs, one in each of a plurality of schedule intervals.

According to a third aspect of the present disclosure, there is provided a method for a base station (BS) to generate multicast and broadcast service (MBS) data frames, the method comprising: receiving a plurality of synchronization maps (SYNC MAPs) in ones of a plurality of schedule intervals, one of the SYNC MAPs being received in each of the ones of the schedule intervals; and generating the MBS data frames based on the received SYNC MAPs.

According to a fourth aspect of the present disclosure, there is provided a base station (BS) for providing multicast and broadcast services (MBSs), the BS comprising: an input/output (I/O) device configured to receive a plurality of synchronization maps (SYNC MAPs) in ones of a plurality of schedule intervals, one of the SYNC MAPs being received in each of the ones of the schedule intervals; and a processor configured to generate data frames for the MBSs based on the received SYNC MAPs.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 1:
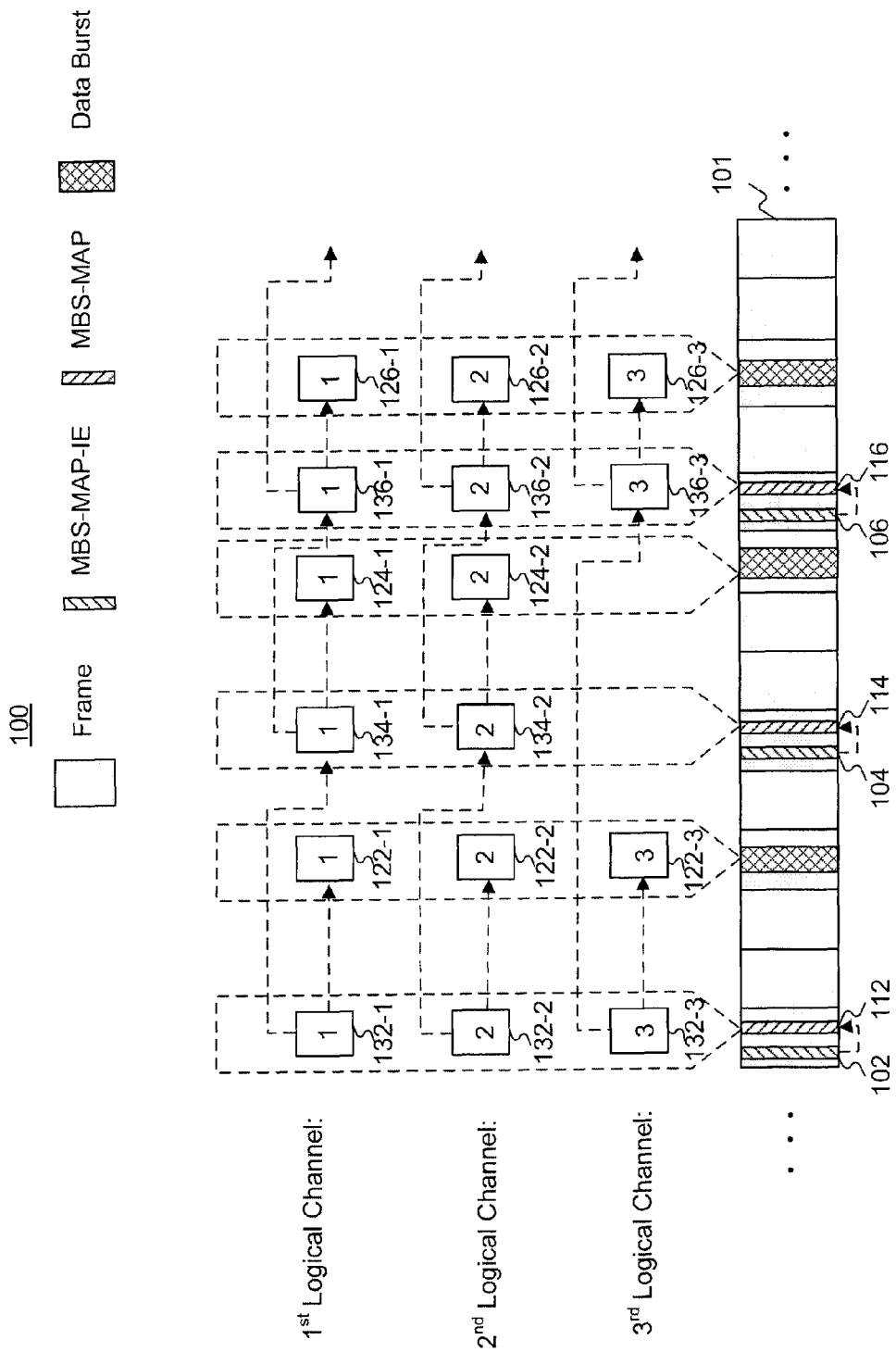
FIG. 1 illustrates a conventional multicast and broadcast service (MBS) data structure, according to IEEE standard 802.16.
Figure 2:
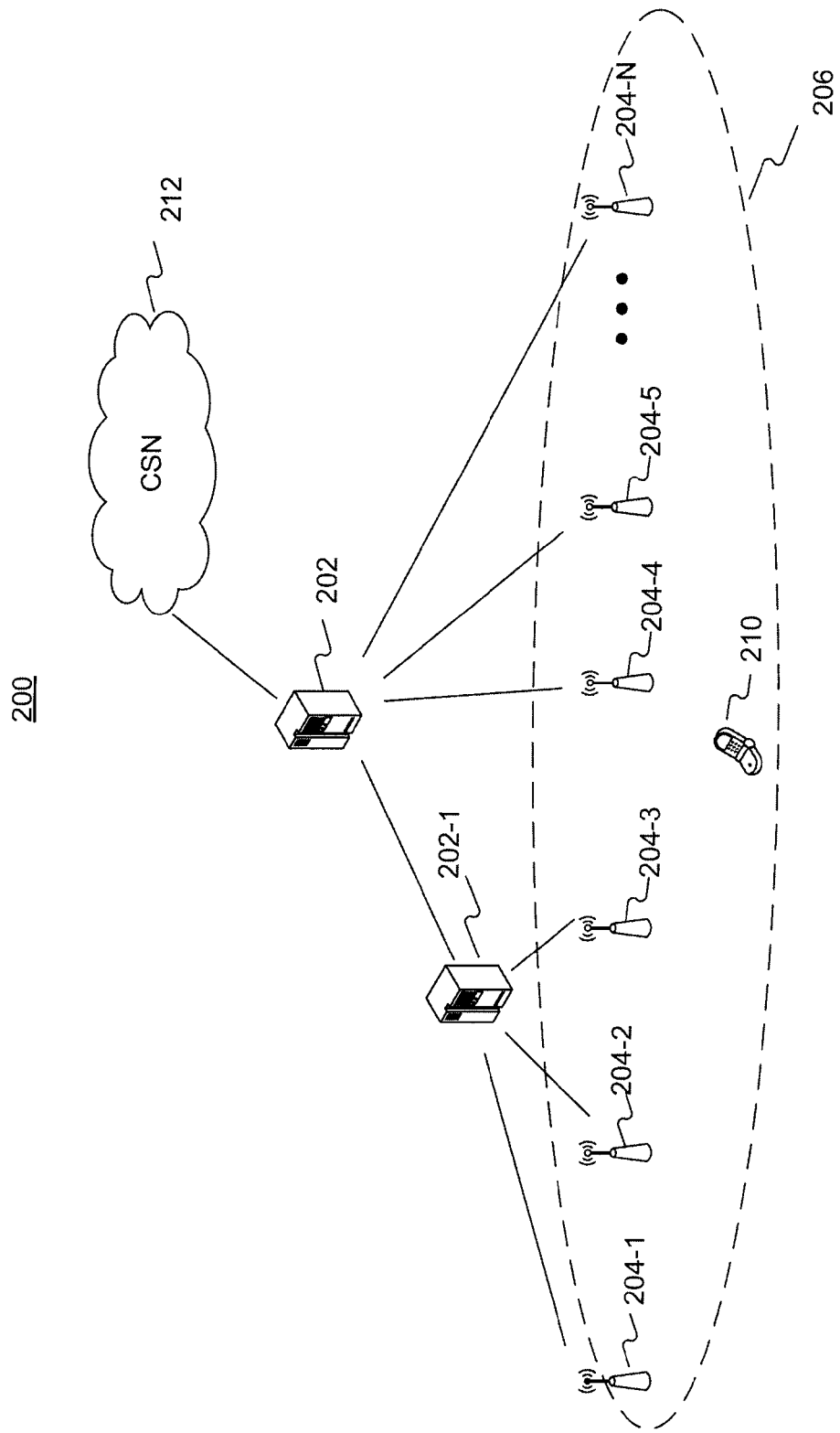
FIG. 2 illustrates a schematic block diagram of a communication system for providing MBSs, according to an exemplary embodiment.

FIG. 2 illustrates a schematic block diagram of a communication system 200 for providing multicast and broadcast services (MBSs) in a wireless network, such as a Worldwide Interoperability for Microwave Access (WiMAX) network, according to an exemplary embodiment. Referring to FIG. 2, the communication system 200 may include at least one access service network gateway (ASN-GW) 202, and a plurality of base stations (BSs) 204-1, 204-2, . . . , 204-N (N is the total number of the BSs in the communication system 200) distributed in one or more MBS zones. An MBS zone is a set of BSs in a geographic area which use a same multicast connection identifier (MCID) to transmit MBS data. For illustrative purposes only, it is assumed that the BSs 204-1, 204-2, . . . , 204-N are distributed in an MBS zone 206.

The communication system 200 may further include a serving ASN-GW 202-1 and a user terminal such as a mobile station (MS) 210. The MS 210 may subscribe to the MBSs, such as to receive movies, games, and TV programs, and receive the subscribed MBSs through access to one or more of the BSs 204-1, 204-2, . . . , 204-N.

In exemplary embodiments, the ASN-GW 202 is configured to connect to a connectivity service network (CSN) 212, which may provide key control and management functions for, e.g., authentication of the MS 210. For example, the CSN 212 may include an MBS controller and one or more MBS content servers (not shown). The MBS content servers may store content data of the MBSs. The MBS controller may receive the content data of the MBSs from the MBS content servers, and send the received content data to the ASN-GW 202.

In exemplary embodiments, the ASN-GW 202 may communicate with a BS directly or through a serving ASN-GW. For example, in the illustrated embodiment, the ASN-GW 202 communicates with the BSs 204-1, 204-2, and 204-3 through the serving ASN-GW 202-1, and communicates with the BSs 204-4, 204-5, . . . , 204-N directly. Under such a configuration, the ASN-GW 202 may be referred to as an anchor ASN-GW.

In exemplary embodiments, the ASN-GW 202 is configured to generate a plurality of synchronization maps (SYNC MAPs), and transmit to the BSs 204-1, 204-2, . . . , 204-N the generated SYNC MAPs, one in each of a plurality of schedule intervals. Based on the SYNC MAPs, the BSs 204-1, 204-2, . . . , 204-N each may generate synchronized data frames for the MBSs, and each of the data frames may include control information, such as a downlink map (DL-MAP) including an MBS map information element (MBS-MAP-IE) and an MBS map (MBS-MAP) including MBS data information elements (MBS-DATA-IEs), and content information such as data bursts, as described above. The BSs 204-1, 204-2, . . . , 204-N may further transmit substantially identical MBS data, e.g., substantially identical signal waveforms, to the MS 210. Accordingly, the MS 210 may simultaneously receive signals from ones of the BSs 204-1, 204-2, . . . , 204-N in the MBS zone 206.

In exemplary embodiments, the ASN-GW 202 is configured to transmit the SYNC MAPs based on a retransmission scheme, such as an automatic repeat request (ARQ) scheme or a hybrid automatic repeat request (HARQ) scheme. Accordingly, if one or more of the BSs 204-1, 204-2, . . . , 204-N do not receive a SYNC MAP from the ASN-GW 202 at a first transmission during one of the schedule intervals, the ASN-GW 202 may retransmit the SYNC MAP to the one or more of the BSs 204-1, 204-2, . . . , 204-N during that schedule interval.

In exemplary embodiments, contents of each of the SYNC MAPs may include a SYNC MAP sequence number, synchronization ruler information, and synchronization timing information. For example, the SYNC MAP sequence number is used to identify the SYNC MAP. Also for example, the synchronization ruler information is used to indicate to the BSs 204-1, 204-2, . . . , 204-N how to schedule data packets, such that the BSs 204-1, 204-2, . . . , 204-N may generate substantially identical DL-MAPs, MBS-MAPs, and data bursts.

In exemplary embodiments, the synchronization ruler information in a SYNC MAP may include a synchronization ruler counter, connection configuration information, a forward error correction (FEC) type, a modulation type, a reception coding scheme, retransmission settings, and other information. For example, the synchronization ruler counter may increase by one if the synchronization ruler information is updated. Also for example, the FEC type may be block coding or convolutional coding. Further for example, the retransmission settings may be ARQ or HARQ settings.

In exemplary embodiments, the synchronization timing information in a SYNC MAP may include an MBS-MAP frame number or a coordinated universal time (UTC) time, e.g., 32 bits, a number of generic route encapsulation (GRE) keys, e.g., 8 bits, and a number of MBS-MAPs, e.g., 8 bits. For each of the GRE keys, the synchronization timing information may further include the GRE key itself, e.g., 32 bits, a start GRE sequence number, e.g., 32 bits, and an end GRE sequence number, e.g., 32 bits. For each of the MBS-MAPs, the synchronization timing information may further include a content of the MBS-MAP.

In exemplary embodiments, the synchronization timing information in a current SYNC MAP may include a transmission time of a next SYNC MAP. For example, the transmission time may indicate to each of the BSs 204-1, 204-2, . . . , 204-N when the next SYNC MAP will be transmitted from the ASN-GW 202. In one exemplary embodiment, the transmission time may be 16 bits.

Figure 3:
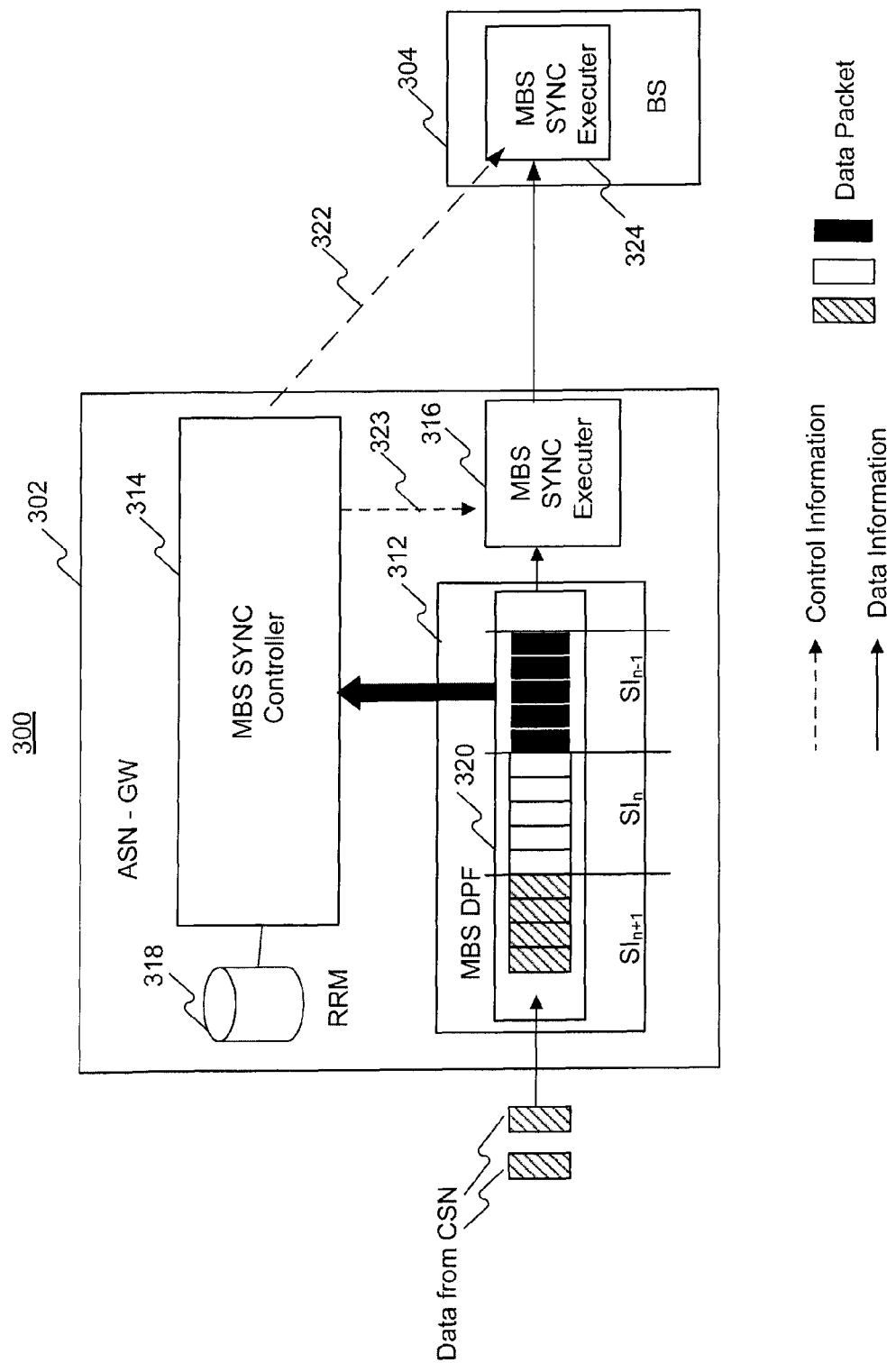
FIG. 3 illustrates a schematic block diagram of a synchronization architecture for implementing synchronization maps (SYNC MAPs), according to an exemplary embodiment.

FIG. 3 illustrates a schematic block diagram of a synchronization architecture 300 for implementing the SYNC MAPs described above, according to an exemplary embodiment. For convenience of illustration, an ASN-GW 302 and a BS 304 are shown for the synchronization architecture 300. For example, the ASN-GW 302 may be the ASN-GW 202 (FIG. 2), and the BS 304 may be any one of the BSs 204-1, 204-2, . . . , 204-N (FIG. 2).

In exemplary embodiments, the ASN-GW 302 may include an MBS data path function (DPF) 312, an MBS synchronization (SYNC) controller 314, an MBS SYNC executer 316, and a radio resource management (RRM) component 318. The MBS DPF 312, the MBS SYNC controller 314, and the MBS SYNC executer 316 each may be implemented using software, and the RRM component 318 may be implemented using hardware.

In exemplary embodiments, the MBS DPF 312 may receive MBS content data as Internet Protocol (IP) data packets from a data source, such as the CSN 212 (FIG. 2). The received MBS content data is temporarily stored in a queue 320 in the MBS DPF 312, which corresponds to, e.g., a first schedule interval $SI_{n-1}$, a second schedule interval $SI_n$, and a third schedule interval $SI_{n+1}$. For example, the IP data packets that correspond to the different schedule intervals are represented by small blocks with different shaded patterns.

In exemplary embodiments, the MBS DPF 312 may forward the MBS content data to the MBS SYNC controller 314. The MBS SYNC controller 314 may interpret the MBS content data to obtain synchronization ruler information and synchronization timing information. The MBS SYNC controller 314 may further generate a SYNC MAP including the synchronization ruler information and the synchronization timing information as control information, and send (322) the SYNC MAP to the BS 304. In addition, the MBS SYNC controller 314 may send the synchronization ruler information to the MBS SYNC executer 316 in each schedule interval (323).

In addition, the MBS DPF 312 may forward the MBS content data as data information to the MBS SYNC executor 316. The MBS SYNC executer 316 may add GRE headers to the MBS content data to generate GRE data packets. The MBS SYNC executer 316 may further forward the GRE data packets to the BS 304.

Based on the received SYNC MAP and GRE data packets, the BS 304 may generate data frames to be transmitted to an MS. For example, the BS 304 may also include an MBS SYNC executor 324, which may generate the data frames.

Figure 4:
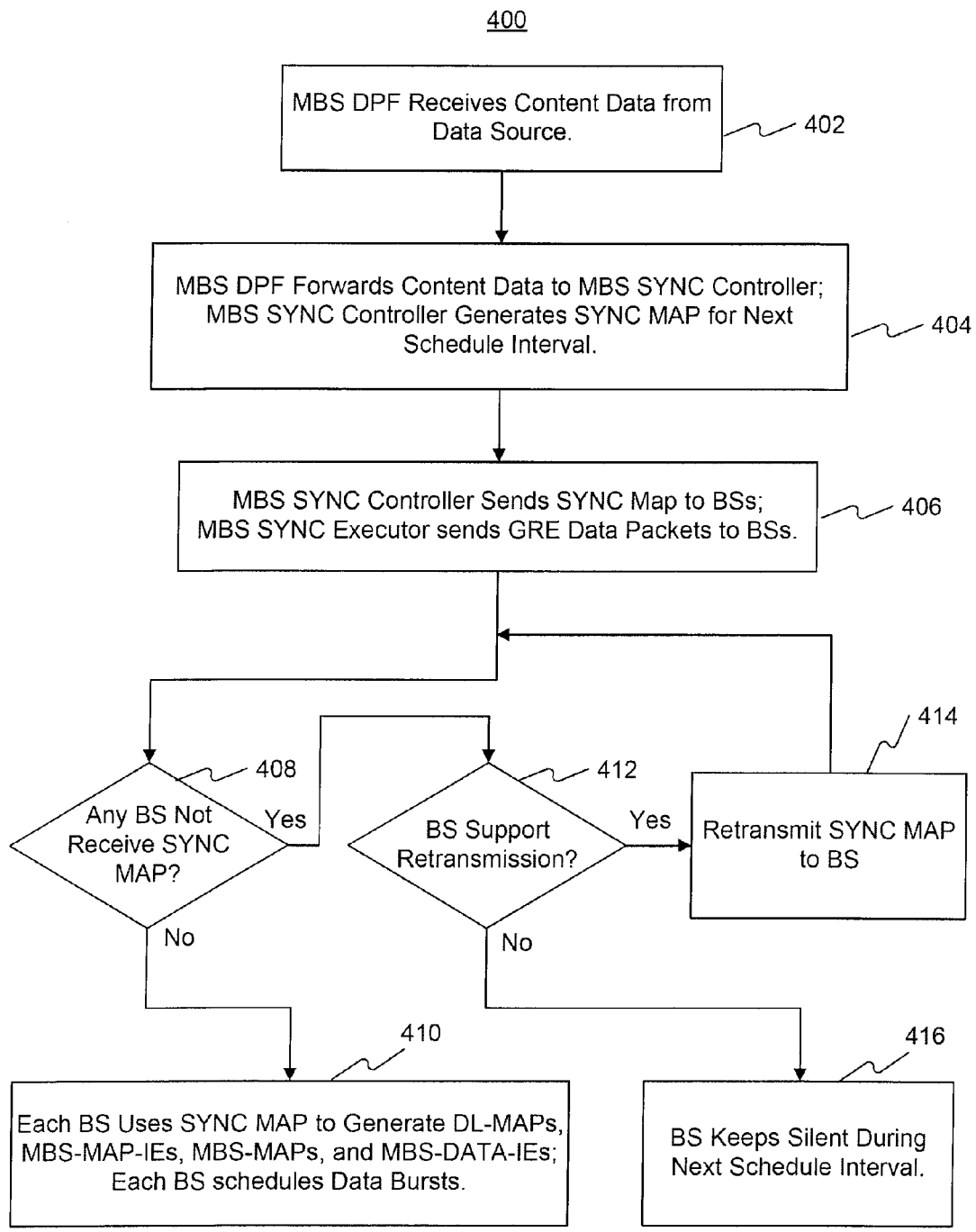
FIG. 4 illustrates a flow chart of an MBS synchronization method, according to an exemplary embodiment.

FIG. 4 illustrates a flow chart of an MBS synchronization method 400 for the communication system 200 (FIG. 2), according to an exemplary embodiment. Referring to FIGS. 2 and 4, the MBS DPF in the ASN-GW 202 receives MBS content data from a data source such as the CSN 212 (402). The MBS DPF further forwards the received MBS content data to the MBS SYNC controller in the ASN-GW 202, and the MBS SYNC controller generates, during a current schedule interval, a SYNC MAP for a next schedule interval based on the MBS content data (404). The MBS SYNC controller further sends, during the current schedule interval, the SYNC MAP for the next schedule interval to the BSs 204-1, 204-2, . . . , 204-N. In addition, the MBS DPF forwards the MBS content data to the MBS SYNC executer in the ASN-GW 202, and the MBS SYNC executer in the ASN-GW 202 sends GRE data packets including the MBS content data to the BSs 204-1, 204-2, . . . , 204-N, during the current schedule interval (406).

Next, it is determined whether any one of the BSs 204-1, 204-2, . . . , 204-N does not receive the SYNC MAP during the current schedule interval (408). If it is determined that all of the BSs 204-1, 204-2, . . . , 204-N received the SYNC MAP (408—No), each of the BSs 204-1, 204-2, . . . , 204-N may use the SYNC MAP to generate DL-MAPs including MBS-MAP-IEs and MBS-MAPs including MBS-DATA-IEs and to schedule data bursts, to thereby generate data frames to be transmitted in the next schedule interval (410).

If it is determined that one of the BSs 204-1, 204-2, . . . , 204-N, e.g., the BS 204-1, does not receive the SYNC MAP (408—Yes), it is further determined whether the BS 204-1 supports receiving data based on a retransmission scheme, such as the ARQ scheme or the HARQ scheme (412). If it is determined that the BS 204-1 supports receiving data based on a retransmission scheme (412—Yes), the MBS SYNC controller in the ASN-GW 202 retransmits the SYNC MAP to the BS 204-1 (414) during the current schedule interval, and step 408 is repeated. If it is determined that the BS 204-1 does not support receiving data based on a retransmission mechanism (412—No), the BS 204-1 may not generate data frames, i.e., keeps silent, during the next schedule interval (416).

Figure 5:
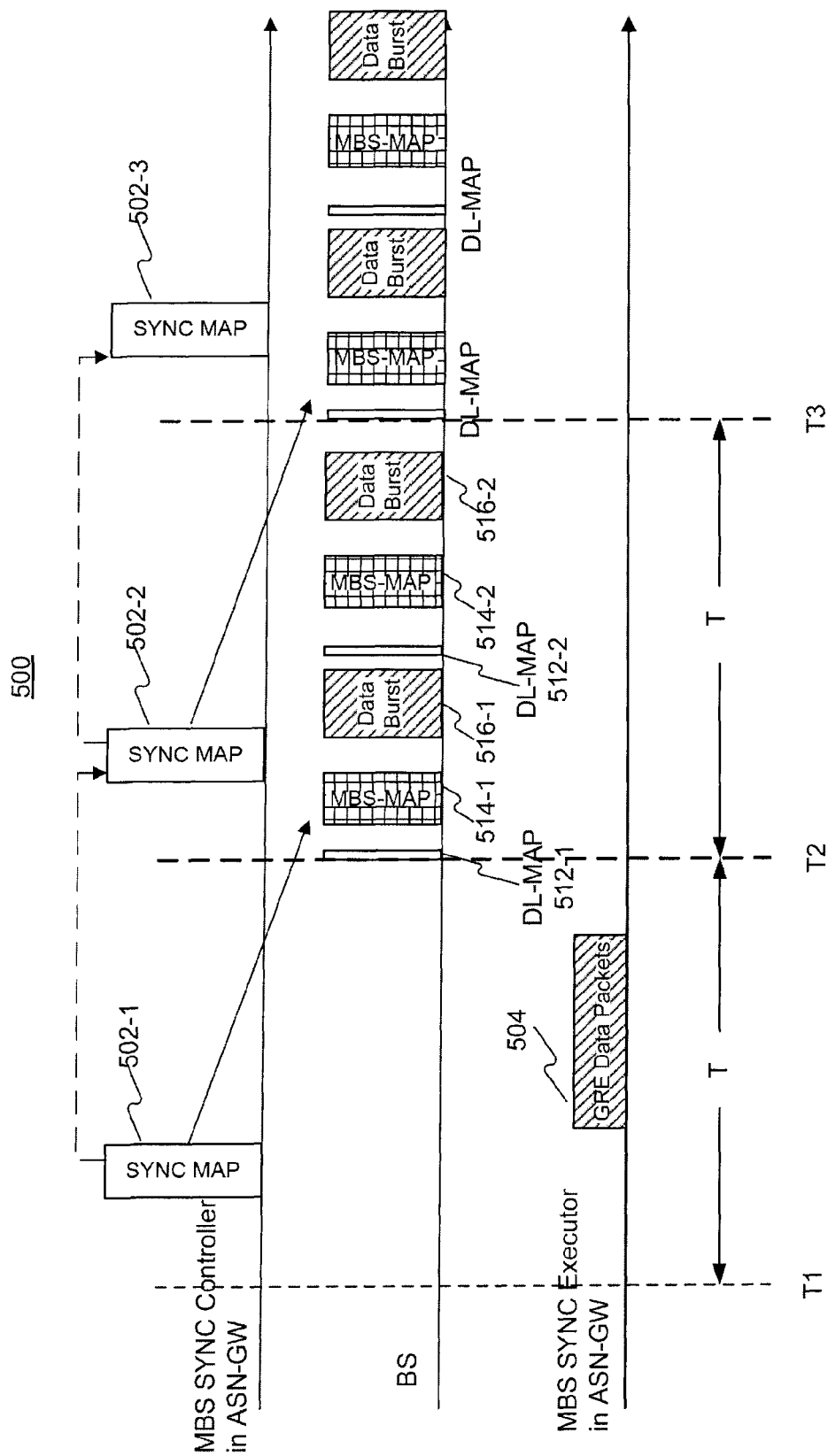
FIG. 5 illustrates a method for a base station (BS) to generate data frames based on SYNC MAPs, according to an exemplary embodiment.

FIG. 5 illustrates a method 500 for a BS to generate data frames based on SYNC MAPs received from an ASN-GW, according to an exemplary embodiment. For example, the BS may be any one of the BSs 204-1, 204-2, . . . , 204-N (FIG. 2), and the ASN-GW may be the ASN-GW 202 (FIG. 2).

In exemplary embodiments, the MBS SYNC controller in the ASN-GW may send a SYNC MAP 502-1 to the BS during a first schedule interval, e.g., from a UTC time T1 to a UTC time T2, and the MBS SYNC executer in the ASN-GW may send GRE data packets 504 including MBS content data to the BS during the first schedule interval. For example, the SYNC MAP 502-1 and the GRE data packets 504 may be sent based on a unicast scheme or a multicast scheme. Also for example, the SYNC MAP 502-1 may include synchronization information regarding multiple MBS-MAPs, and may include synchronization timing information such as a transmission time of a SYNC MAP 502-2 to be transmitted during a second schedule interval, e.g., from the UTC time T2 to a UTC time T3, which is illustrated by the dashed arrow from the SYNC MAP 502-1 to the SYNC MAP 502-2. The first and second schedule intervals may have a same duration T, such as one second.

In exemplary embodiments, based on the SYNC MAP 502-1 and the GRE data packets 504, the BS may generate, e.g., DL-MAPs 512-1 and 512-2 and MBS-MAPs 514-1 and 514-2, and schedule, e.g., data bursts 516-1 and 516-2, to thereby generate data frames to be transmitted in the second schedule interval, which is illustrated by the solid arrow from the SYNC MAP 502-1.

For example, the DL-MAP 512-1 may include a first MBS-MAP-IE (not shown), which indicates a location of the MBS-MAP 514-1 in the data frames. The MBS-MAP 514-1 may include a first MBS-DATA-IE (not shown), which indicates a location of the data burst 516-1 in the data frames. Also for example, the DL-MAP 512-2 may include a second MBS-MAP-IE (not shown), which indicates a location of the MBS-MAP 514-2 in the data frames. The MBS-MAP 514-2 may include a second MBS-DATA-IE (not shown), which indicates a location of the data burst 516-2 in the data frames.

Similarly, other BSs in the same MBS zone as the above-described BS may also generate data frames in the second schedule interval based on the SYNC MAP 502-1 and the GRE data packets 504. As a result, all of the BSs in that MBS zone may transmit substantially identical MBS data, e.g., substantially identical signal waveforms, to an MS, and the MS may simultaneously receive signals from ones of the BSs.

In exemplary embodiments, the SYNC MAP 502-2 may also include synchronization information regarding multiple MBS-MAPs, and may include synchronization timing information such as a transmission time of a SYNC MAP 502-3 to be transmitted during a third schedule interval starting from the UTC time T3, which is illustrated by the dashed arrow from the SYNC MAP 502-2 to the SYNC MAP 502-3. Based on the SYNC MAP 502-2, the BS may generate DL-MAPs and MBS-MAPs and schedule data bursts, to thereby generate data frames in the third schedule interval, which is illustrated by the solid arrow from the SYNC MAP 502-2.

In exemplary embodiments, the transmission time of the next SYNC MAP, included in the current SYNC MAP, may be used to implement data retransmission. For example, the BS may determine an arrival time range for the next SYNC MAP based on the transmission time of the current SYNC MAP. If the BS does not receive the next SYNC MAP within the determined arrival time range, the BS may notify the ASN-GW such that the MBS SYNC controller in the ASN-GW may retransmit that next SYNC MAP based on, e.g., the ARQ scheme or the HARQ scheme. In addition, a SYNC MAP received from the ASN-GW may also provide scheduling and resource management assistance for the BS. If the BS loses synchronization with other BSs that are in the same MBS zone as the BS, the received SYNC MAP may help the BS to achieve resynchronization.

Figure 6:
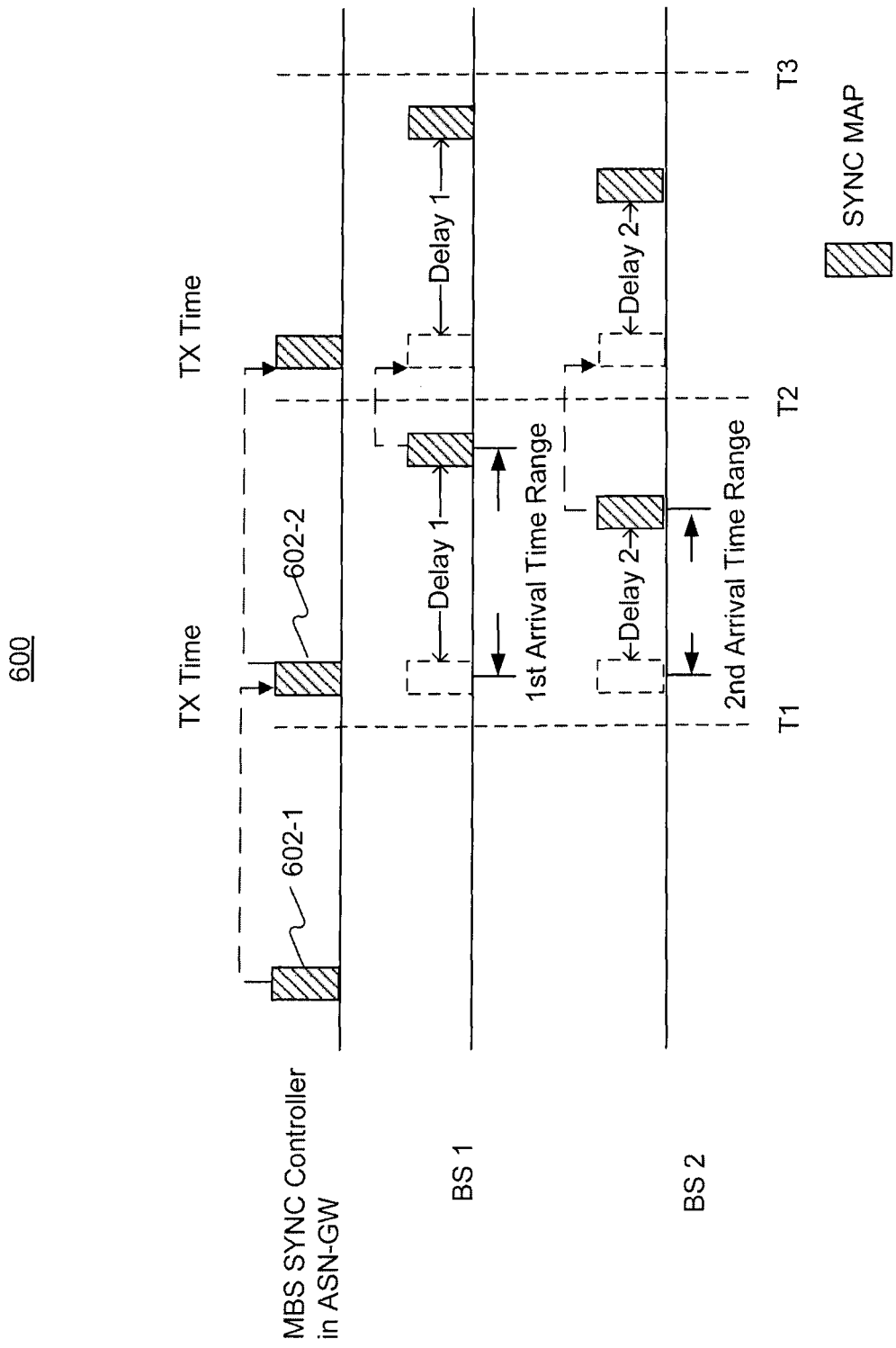
FIG. 6 illustrates a method for a plurality of BSs to each determine an arrival time range for a next SYNC MAP based on a current SYNC MAP, according to an exemplary embodiment.

FIG. 6 illustrates a method 600 for the BSs 204-1, 204-2, . . . , 204-N (FIG. 2) to each determine an arrival time range for a next SYNC MAP 602-2 based on a current SYNC MAP 602-1, according to an exemplary embodiment. For convenience of explanation, first and second ones of the BSs 204-1, 204-2, . . . , 204-N, referred to herein as BS 1 and BS 2, are shown in FIG. 6.

In exemplary embodiments, BS 1 and BS 2 each may determine an arrival time range for the next SYNC MAP 602-2 based on a delay tolerance. For example, latencies between the SYNC controller in the ASN-GW 202 (FIG. 2) and each of BS 1 and BS 2 may be different. Therefore, BS 1 may determine a first arrival time range for the next SYNC MAP 602-2 based on the transmission (TX) time of the next SYNC MAP 602-2, which is included in the current SYNC MAP 602-1, and the delay tolerance for BS1, e.g., Delay 1. If BS 1 does not receive the SYNC MAP 602-2 within the first arrival time range, BS 1 may notify the ASN-GW 202 (FIG. 2) for retransmission. Similarly, BS 2 may determine a second arrival time range for the next SYNC MAP 602-2 based on the transmission time of the next SYNC MAP 602-2 and the delay tolerance for BS 2, e.g., Delay 2. If BS 2 does not receive the SYNC MAP 602-2 within the second arrival time range, BS 2 may notify the ASN-GW 202 (FIG. 2) for retransmission.

For example, when BS 1 receives the current SYNC MAP 602-1 and knows the transmission time of the next SYNC MAP 602-2, BS 1 may determine that transmission time to be a lower bound for the first arrival time range. BS 1 may further determine an upper bound for the first arrival time range by calculating a sum of the transmission time of the next SYNC MAP 602-2 and the delay tolerance Delay 1. Also for example, when BS 2 receives the current SYNC MAP 602-1 and knows the transmission time of the next SYNC MAP 602-2, BS 2 may determine that transmission time to be a lower bound for the second arrival time range. BS 2 may further determine an upper bound for the second arrival time range by calculating a sum of the transmission time of the next SYNC MAP 602-2 and the delay tolerance Delay 2.

Figure 7A:
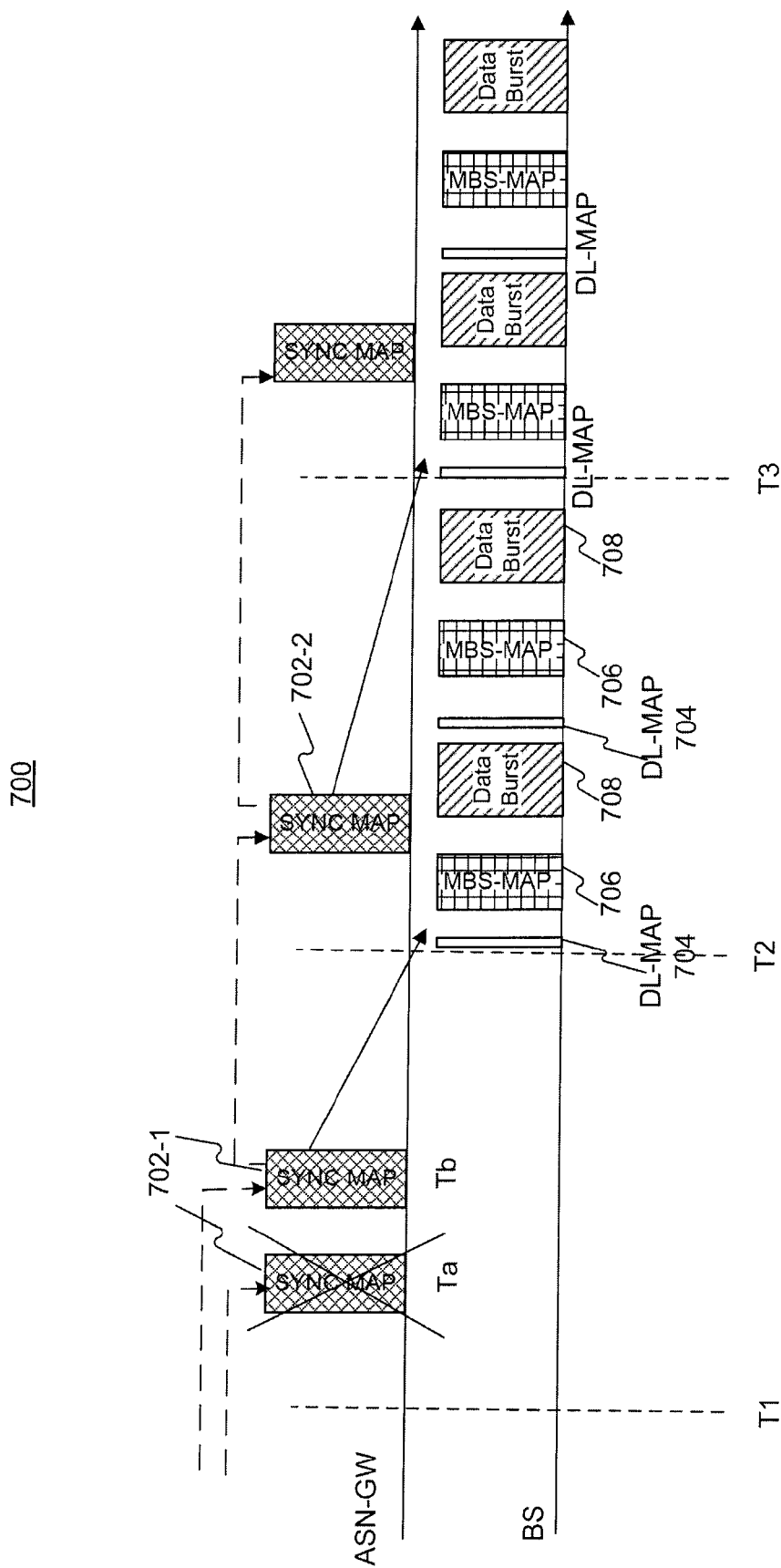
FIGS. 7A and 7B illustrate a method for an access service network gateway (ASN-GW) to retransmit a SYNC MAP to a BS, according to an exemplary embodiment.
Figure 7B:
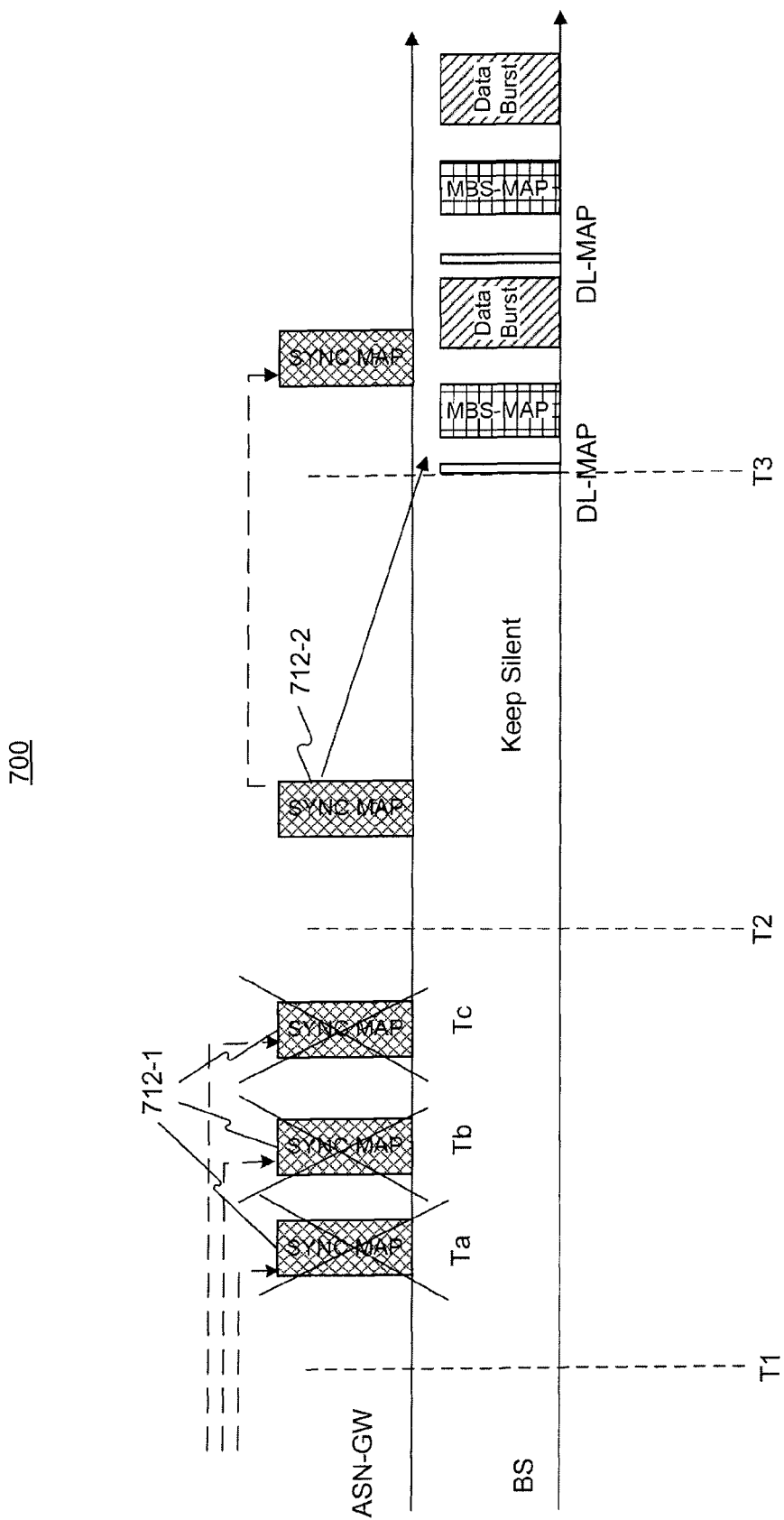

FIGS. 7A and 7B illustrate a method 700 for an ASN-GW to retransmit a SYNC MAP to a BS, according to an exemplary embodiment. For example, the ASN-GW may be the ASN-GW 202 (FIG. 2), and the BS may be any one of the BSs 204-1, 204-2, . . . , 204-N (FIG. 2).

In one exemplary embodiment, shown in FIG. 7A, the ASN-GW sends a SYNC MAP 702-1 to the BS at a first time Ta during a first schedule interval, e.g., from a UTC time T1 to a UTC time T2. However, the BS does not receive the SYNC MAP 702-1 within an arrival time range, which may be determined based on the method described above with reference to FIG. 6. Accordingly, the BS sends a signal NAK to the ASN-GW, to indicate that the BS does not receive the SYNC MAP 702-1. In response to receiving the signal NAK, the ASN-GW may retransmit the SYNC MAP 702-1 to the BS based on, e.g., the ARQ scheme or the HARQ scheme, at a second time Tb during the first schedule interval.

In the illustrated embodiment, it is assumed that the BS receives the SYNC MAP 702-1 transmitted at the second time Tb. Therefore, based on the SYNC MAP 702-1, the BS may generate DL-MAPs 704 including MBS-MAP-IEs (not shown) and MBS-MAPs 706 including MBS-DATA-IEs (not shown), and schedule data bursts 708, to thereby generate data frames to be transmitted in a second schedule interval, e.g., from the UTC time T2 to a UTC time T3. The first and second schedule intervals may have the same duration, e.g., one second. The BS may also determine an arrival time range for a next SYNC MAP 702-2, as described above. During the second schedule interval, the ASN-GW transmits the SYNC MAP 702-2 to the BS. Based on the SYNC MAP 702-2, the BS may generate DL-MAPs including MBS-MAP-IEs and MBS-MAPs including MBS-DATA-IEs, and schedule data bursts for a next schedule interval starting from the UTC time T3.

In one exemplary embodiment, shown in FIG. 7B, the ASN-GW sends a SYNC MAP 712-1 to the BS at a first time Ta during a first schedule interval, e.g., from a UTC time T1 to a UTC time T2. However, the BS does not receive the SYNC MAP 712-1 within an arrival time range, which may be determined based on the method described above with reference to FIG. 6. Accordingly, the BS sends a signal NAK to the ASN-GW, to indicate that the BS does not receive the SYNC MAP 712-1. In response to receiving the signal NAK, the ASN-GW may retransmit the SYNC MAP 712-1 to the BS based on, e.g., the ARQ scheme or the HARQ scheme, at a second time Tb during the first schedule interval.

In the illustrated embodiment, it is assumed that the BS does not receive the SYNC MAP 712-1 retransmitted at the second time Tb. Therefore, the BS again sends the signal NAK to the ASN-GW, to indicate that the BS still does not receive the SYNC MAP 712-1. In response to receiving the signal NAK, the ASN-GW may retransmit the SYNC MAP 712-1 to the BS at a third time Tc during the first schedule interval.

In the illustrated embodiment, it is further assumed that the BS does not receive the SYNC MAP 712-1 retransmitted at the third time Tc, and also the SYNC MAP 712-1 retransmitted at following times (not shown) during the first schedule interval. Accordingly, the BS may not generate DL-MAPs and MBS-MAPs for a second schedule interval, e.g., from the UTC time T2 to a UTC time T3. As a result, the BS may not generate data frames, i.e., keeps silent, for the second schedule interval. In addition, the BS keeps trying to receive a SYNC MAP until it receives a second SYNC MAP 712-2. Based on the SYNC MAP 712-2, the BS may generate DL-MAPs including MBS-MAP-IEs and MBS-MAPs including MBS-DATA-IEs, and schedule data bursts for a next schedule interval starting from the UTC time T3.

Figure 8:
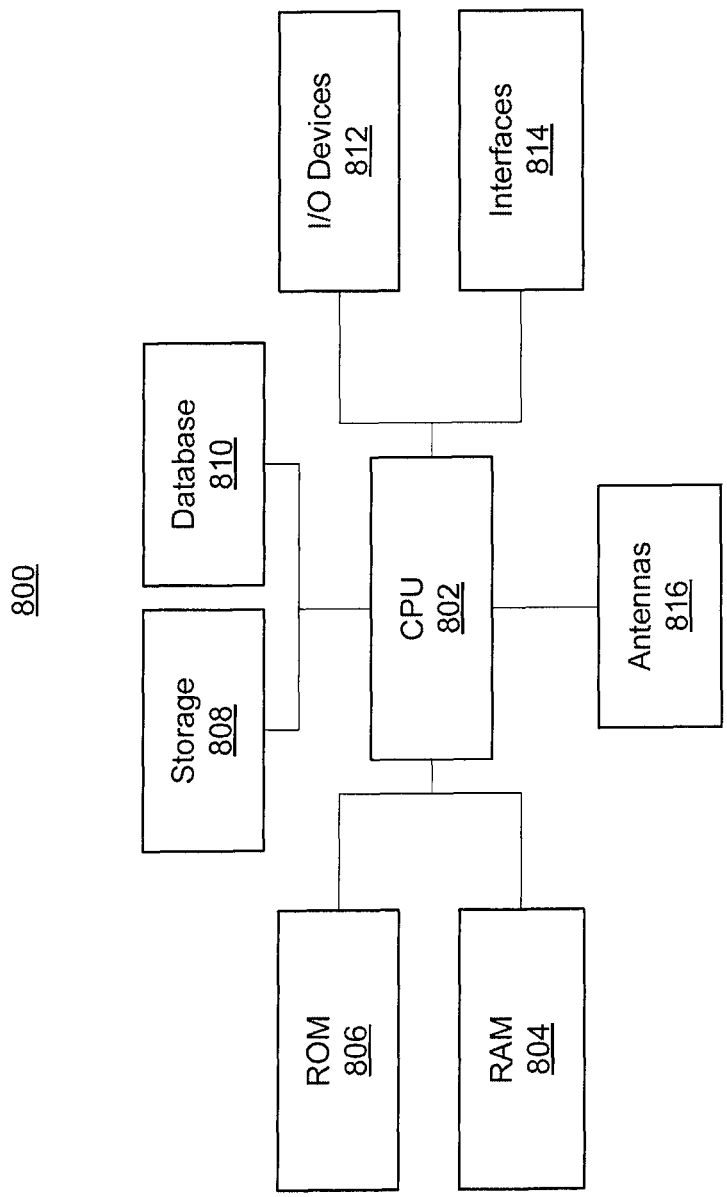
FIG. 8 illustrates a block diagram of an ASN-GW, according to an exemplary embodiment.

FIG. 8 illustrates a block diagram of an exemplary ASN-GW 800, according to an exemplary embodiment. For example, the ASN-GW 800 may be the ASN-GW described above in any of FIGS. 2-7B. Referring to FIG. 8, the ASN-GW 800 may include one or more of the following components: at least one central processing unit (CPU) 802 configured to execute computer program instructions to perform various processes and methods, random access memory (RAM) 804 and read only memory (ROM) 806 configured to access and store information and computer program instructions, storage 808 to store data and information, databases 810 to store tables, lists, or other data structures, input/output (I/O) devices 812, interfaces 814, antennas 816, etc. Each of these components is well-known in the art and will not be discussed further.

Figure 9:
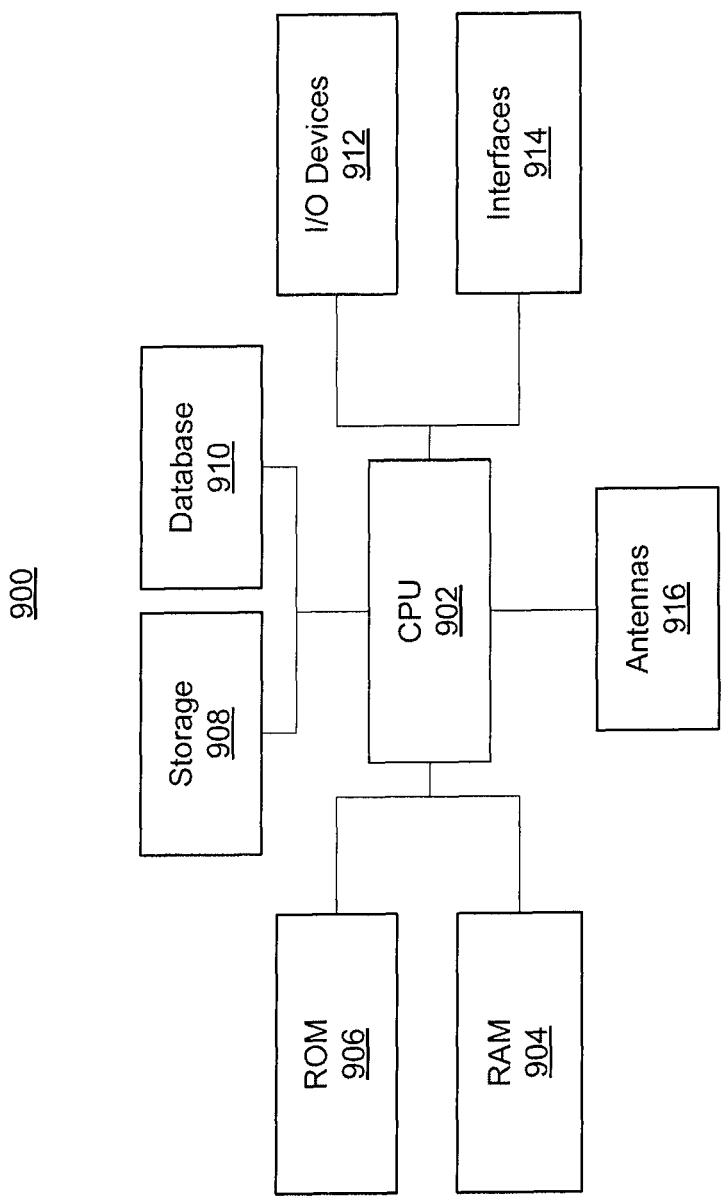
FIG. 9 illustrates a block diagram of a BS, according to an exemplary embodiment.

FIG. 9 illustrates a block diagram of an exemplary BS 900, according to an exemplary embodiment. For example, the BS 900 may be the BS described above in any of FIGS. 2-7B. Referring to FIG. 9, the BS 900 may include one or more of the following components: at least one central processing unit (CPU) 902 configured to execute computer program instructions to perform various processes and methods, random access memory (RAM) 904 and read only memory (ROM) 906 configured to access and store information and computer program instructions, storage 908 to store data and information, databases 910 to store tables, lists, or other data structures, input/output (I/O) devices 912, interfaces 914, antennas 916, etc. Each of these components is well-known in the art and will not be discussed further.

While embodiments have been described based on a WiMAX network, the invention is not so limited. It may be practiced with equal effectiveness with other networks such as a 3rd Generation Partnership Project (3GPP) network.

Other embodiments of the invention will be apparent to those skilled in the art from consideration of the specification and practice of the invention disclosed herein. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for an access service network gateway (ASN-GW) to provide multicast and broadcast services (MBSs) through a plurality of base stations (BSs) in an MBS zone, the method comprising:
generating, by the ASN-GW, a plurality of synchronization maps (SYNC MAPS) including synchronization information for synchronizing MBS data frames to be generated by the BSs; and
transmitting, by the ASN-GW, to the BSs the generated SYNC MAPs, one in each of a plurality of schedule intervals, wherein when a first one of the SYNC MAPs transmitted in a first one of the schedule intervals is not received by one of the BSs, the transmitting further comprises retransmitting the first one of the SYNC MAPs in the first one of the schedule intervals; and the first one of the plurality of SYNC MAPs includes a transmission time of a second one of the plurality of SYNC MAPs, and at least one of the BSs determines an arrival time range for the second one of the plurality SYNC MAPs based on the transmission time of the second one of the plurality SYNC MAPs and a delay tolerance.

2. The method of claim 1, wherein the generating further comprises including, in a current one of the SYNC MAPs, a transmission time of a next one of the SYNC MAPs.

3. The method of claim 1, wherein the generating further comprises including, in each of the SYNC MAPs, a different SYNC MAP sequence number to identify the SYNC MAPs.

4. The method of claim 1, wherein the generating further comprises including synchronization ruler information in each of the SYNC MAPs.

5. The method of claim 1, wherein the generating further comprises including synchronization timing information in each of the SYNC MAPs.

6. The method of claim 1, wherein the transmitting further comprises transmitting the SYNC MAPs based on a unicast scheme.

7. The method of claim 1, wherein the transmitting further comprises transmitting the SYNC MAPs based on a multicast scheme.

8. The method of claim 1, wherein the retransmitting further comprises retransmitting the first one of the SYNC MAPs based on an automatic repeat request (ARQ) scheme or a hybrid automatic repeat request (HARQ) scheme.

9. An access service network gateway (ASN-GW) for providing multicast and broadcast services (MBSs) through a plurality of base stations (BSs) in an MBS zone, the ASN-GW comprising:

a processor configured to generate a plurality of synchronization maps (SYNC MAPs), the SYNC MAPs including synchronization information for synchronizing MBS data frames to be generated by the BSs; and an input/output (I/O) device configured to transmit to the BSs the generated SYNC MAPs, one in each of a plurality of schedule intervals, wherein when a first one of the SYNC MAPs transmitted in a first one of the schedule intervals is not received by one of the BSs, the input/output (I/O) device retransmits the first one of the SYNC MAPs in the first one of the schedule intervals; and the first one of the plurality of SYNC MAPs includes a transmission time of a second one of the plurality of SYNC MAPs, and at least one of the BSs determines an arrival time range for the second one of the plurality SYNC MAPs based on the transmission time of the second one of the plurality SYNC MAPs and a delay tolerance.

10. A method for a base station (BS) to generate multicast and broadcast service (MBS) data frames, the method comprising:

receiving, from an access service network gateway (ASN-GW), a plurality of synchronization maps (SYNC MAPs) in ones of a plurality of schedule intervals, one of the SYNC MAPs being received in each of the ones of the schedule intervals; and generating, by the BS, the MBS data frames based on the received SYNC MAPs, wherein when a first one of the SYNC MAPs transmitted by the ASN-GW in a first one of the schedule intervals is not received by the BS, the BS requests the ASN-GW to retransmit the first one of the SYNC MAPs; and the first one of the plurality of SYNC MAPs includes a transmission time of a second one of the plurality of SYNC MAPs, and the receiving comprises determining an arrival time range for the second one of the plurality SYNC MAPs based on the transmission time of the second one of the plurality SYNC MAPs and a delay tolerance.

11. The method of claim 10, wherein the determining further comprises determining the transmission time of the second one of the plurality SYNC MAPs to be a lower bound for the arrival time range.

12. The method of claim 10, wherein the determining further comprises calculating a sum of the transmission time of the second one of the plurality SYNC MAPs and the delay tolerance as an upper bound for the arrival time range.

13. The method of claim 10, wherein when the BS does not receive the second one of the plurality of SYNC MAPs in the determined arrival time range, the method further comprises: requesting a retransmission of the second one of the plurality of SYNC MAPs.

14. The method of claim 10, further comprising:
receiving the first one of the plurality of SYNC MAPs in a first one of the plurality of schedule intervals; and
generating, based on the first one of the plurality of SYNC MAPs, the MBS data frames in a second of the plurality of schedule intervals contiguous to the first one of the plurality of schedule intervals.

15. The method of claim 10, wherein when the BS does not receive a SYNC MAP in a first one of the plurality of schedule intervals, the method further comprises: keeping silent in a second one of the plurality of schedule intervals contiguous to the first one of the plurality of schedule intervals.

16. The method of claim 10, wherein the generating further comprises:
generating downlink maps (DL-MAPs) including MBS map information elements (MBS-MAP-IEs), and
MBS maps (MBS-MAPs) including MBS data information elements (MBS-DATA-IEs).

17. A base station (BS) for providing multicast and broadcast services (MBSs), the BS comprising:

an input/output (I/O) device configured to receive, from an access service network gateway (ASN-GW), a plurality of synchronization maps (SYNC MAPs) in ones of a plurality of schedule intervals, one of the SYNC MAPs being received in each of the ones of the schedule intervals; and a processor configured to generate data frames for the MBSs based on the received SYNC MAPs, wherein when a first one of the SYNC MAPs transmitted by the ASN-GW in a first one of the schedule intervals is not received by the BS, the BS requests the ASN-GW to retransmit the first one of the SYNC MAPs; and the first one of the plurality of SYNC MAPs includes a transmission time of a second one of the plurality of SYNC MAPs, and the processor is further configured to determine an arrival time range for the second one of the plurality SYNC MAPs based on the transmission time of the second one of the plurality SYNC MAPs and a delay tolerance.

* * * * *